Sept. 4, 1962 D. J. McLAUGHLIN 3,052,879
DIGITALIZED ELECTRONIC INCREMENTAL DETECTOR
Filed Dec. 31, 1958
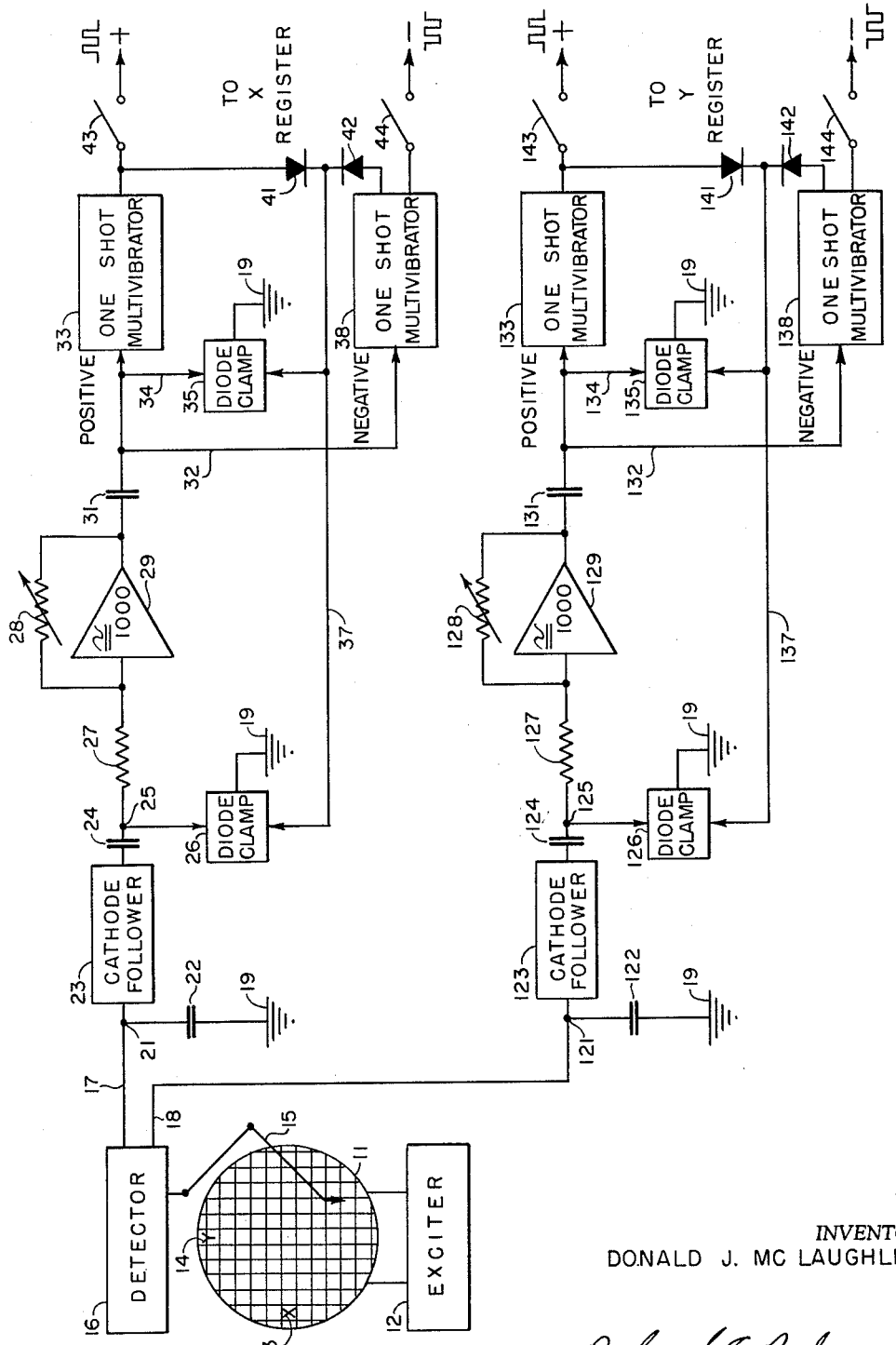
INVENTOR
DONALD J. MC LAUGHLIN
BY Richard C. Reed
ATTORNEY

United States Patent Office 3,052,879
Patented Sept. 4, 1962

3,052,879
DIGITALIZED ELECTRONIC INCREMENTAL DETECTOR
Donald J. McLaughlin, 3730 Camden St. SE., Washington, D.C.
Filed Dec. 31, 1958, Ser. No. 784,408
3 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

This invention relates, in general, to incremental detectors and, more particularly, to electronic incremental detectors converting the detected increment to digital form.

In electronic circuits which provide rectangular cartesian coordinate voltages representative of the relative position of a probe on a planar surface such as an electrical probe on a conductive surface, the information is supplied as analog signals. These analog signals are appropriate for direct application to analog computing machines. However, the greater versatility and higher accuracy of digital computers makes their use highly desirable. But to use digital computers, means must be provided for converting the analog signals to digital form. In addition, the changes in position of the probe are highly significant in many instances such as tracking the position of a moving target displayed on a radar indicator. In such circumstances it is of great importance to measure these changes with the greatest possible accuracy. Accordingly it becomes particularly desirable to reduce these incremental changes directly to digital values. In addition the computer function is facilitated by providing it with direct information of the incremental values. Conventional analog to digital converters, in measuring the entire co-ordinate value, would have their percentage of error figure much closer to the incremental value than a device measuring the increment alone and in addition would require the computer to measure the direction and magnitude of coordinate value changes.

It is, therefore, an object of this invention to provide a circuit for converting incremental voltage changes to digital pulse groups.

It is another object of this invention to provide a circuit for detecting incremental voltage changes and producing digital pulse groups representative of both the magnitude and direction of the change.

Still another object of this invention is to provide a circuit which provides rectangular cartesian coordinate information of the movement of an electronic pencil across a conductive surface.

The exact nature of this invention as well as other objects and advantages thereof will be readily apparent from consideration of the following description relating to the annexed drawing in which:

The single FIGURE shows the circuit of a preferred embodiment of the invention.

Briefly, the circuit of this invention provides a simple means of detecting incremental changes in analog voltage inputs and provides an output pulse for each incremental change, the output pulse including proper direction information.

For a more complete understanding of the circuit of this invention, the following discussion of a typical signal source means is presented. In a system which includes a display device which includes a glass plate with a conducting surface thereon, alternate energization of the conducting surface in the X and Y rectangular cartesian coordinate directions by an exciter provides voltage representation of such coordinate values. Contact of a conducting probe or electronic pencil with any selected point on the conducting surface provides alternate X and Y voltage levels at the probe which are representative of the coordinates of that point selected. The system includes a detector to which the electronic pencil is connected. When the pencil is placed on the plate, the output of the detector provides the X and Y coordinates of the point of contact of the pencil and the plate. Movement of the pencil across the conducting surface produces incremental coordinate voltage changes. If the pencil has been moved along the X axis of the plate, for example, the change of voltage at the X output terminal of the detector represents the particular X value change of the cartesian coordinate of the pencil position. There would be no change in the Y output potential since no movement took place in the Y direction. After the pencil has been placed on the plate and the position of the electronic pencil is established, any movement of the pencil is encoded by the voltage changes caused by movement from such established position. The circuit of this invention, therefore, is not limited to be used with the output of the above discussed detector, but is usable with any circuit which provides a varying analog voltage source.

To utilize a varying analog voltage, the circuit of this invention incorporates the following principles. The circuit for detection of the X coordinate increment is discussed, the Y coordinate circuit being identical thereto. The input analog voltage is stored on a first capacitor. The stored analog voltage is readout by a high impedance cathode follower having a gain approximating unity and acting as a buffer. A second capacitor is used to isolate the direct current component of the readout analog voltage and to apply the incremental changes to an operational amplifier which is provided. The operational amplifier has a high gain characteristic and is used to provide a significant range to be representative of the increment of change in the input to the circuit of this invention. The output of the operational amplifier is applied across a third capacitor which transfers such output to trigger a polarity selected one of two one-shot multivibrators supplied. The multivibrators are polarity sensitive and provide in their outputs significantly polarized half-wave output pulses. The arrival of output pulses at a preselected output terminal represents the direction of motion of the pencil in either the positive or negative direction in the X dimension. The number of pulses represents the number of incremental steps traversed by the motion of the pencil. A pair of diode clamps are provided to re-establish the reference voltages of the transfer capacitors each time an increment of analog change has been accomplished at the input. A like polarized output pulse from either of the one-shot multivibrators provided during operation thereof, is applied across similarly polarized rectifiers to provide clamping action. The unblocking of the diode clamps provides the lowering of the potential on the output side of the second and third capacitors to ground, thereby resetting the circuit so as to be ready for the next increment to be encoded.

Referring now to the drawing, in which the numbers given to the components of the X digital coordinate increment detector circuit have been increased by one hundred in the Y coordinate circuit, a display device with a conducting coating 11 is shown which is electrically energized by an exciter 12 first in an X direction 13 and then in a Y direction 14. An electronic probe or pencil 15 is connected to a detector 16 which is polarity sensitive to the alternate X and Y energization of exciter 12. The X component of the cartesian coordinate of the position of the pencil 15 is applied on lead 17 which connects the detector 16 to input terminal 21 in the X coordinate digitalized incremental detector circuit. The Y component of the cartesian coordinate of the position of the pencil 15 is applied on lead 18 which connects the detector 16 to input terminal 121 in the Y coordinate digitalized incremental detector circuit. Storage capacitor 22 is coupled between input terminal 21 and ground 19. An impedance transformation device, such as a cathode follower circuit, 23 is connected between input terminal 21 and one end of a second control capacitor 24. The other end of the capacitor 24 is connected to a junction 25. Also connected to junction 25 is the input end of an operational amplifier which includes resistor 27, variable resistor 28 and amplifier 29. A third capacitor 31 is provided. One end of capacitor 31 is connected to the output of the operational amplifier and the other end of capacitor 31 is connected to the input ends of two one-shot multivibrators 33 and 38. Multivibrator 33 will be operated when the input analog change transferred across capacitor 31 is greater than the minimum incremental value established and is of positive polarity. Multivibrator 38 is operative when the transfer across capacitor 31 is negative. The positive output of multivibrator 33 is selected by closing switch 43 to be delivered to digital computing machinery, while the negative output of multivibrator 38 is selected by closing of switch 44 to be delivered to digital computing machinery.

A pair of rectifiers 41 and 42 are provided. One end of rectifier, or steering diode 41 is connected to the positive output terminal of multivibrator 33 and one end of rectifier 42 is connected to the positive output terminal of multivibrator 38. The other ends of the two rectifiers are connected together at a junction. The rectifiers are polarized so as to permit current flow toward the junction during the operation of either of the multivibrators. Also connected to the last said junction are two diode clamps 26 and 35. Diode clamp 26 is also connected to junction 25 which is between the control capacitor 24 and the operational amplifier and is connected to ground 19. Diode clamp 35 is connected also to terminal 34 which is between the transfer capacitor 31 and the one-shot multivibrators 33 and 38 and is further connected to ground 19.

In the operation of the circuit of this invention, detector 16, or any similar source which provides a varying analog voltage source, provides an analog voltage variation which is representative of the position changes of the electronic pencil 15. The original placement of the pencil 15 on the conducting surface of the plate 11 immediately provides a voltage which is representative of the coordinates of the point of contact of the pencil and the plate. This voltage is stored in the capacitor 22 and is applied to cathode follower 23. Since the gain of the high impedance cathode follower 23 is approximately unity, the voltage applied to capacitor 24 is substantially the same as the stored voltage in capacitor 22. The circuit values can be set such that the initial surge of voltage, which results from the placement of the pencil on the plate at any place other than the zero potential point, would either provide two chains of output pulses representative of the analog values of both coordinates, or would provide a single, or error, pair of output pulses representative of a very large increment, or would provide no output pulse whatsoever. The production of either of these three conditions is readily provided.

After the initial operation of the circuit following the placement of the pencil on the plate, subsequent movement of the pencil will be represented by incremental voltage transfers across the capacitor 24 (or 124). Such voltage changes are applied to the operational amplifier and appear in the output thereof greatly amplified. These amplified voltages are applied to transfer capacitor 31 and, depending upon the direction of motion of the pencil, will trigger into operation either one-shot multivibrator 33 or one-shot multivibrator 38. The positive output of the operative multivibrator is applied through rectifier 41 or 42, depending on the polarity of the direction of motion of the pencil, to activate diode clamps 26 and 35 to lower the potential at junctions 24 and 34 to ground. This resets the circuit by establishing the voltage references of the capacitors 24 and 31 to their respective levels. The level of capacitor 24 returns to the level of storage capacitor 22 and the level of capacitor 31 returns to a fixed level, which could be ground. The circuit is now ready for the next incremental change transferred by capacitor 24, and the continued operation of the circuit follows.

The circuit for the Y coordinate of the motion of the pencil operates exactly as does the circuit for the X coordinate and all of the numbers in the above discussion can have added thereto one hundred to have the discussion read right on the Y coordinate circuit.

In conclusion, it is seen that I have provided an efficient circuit for detecting the incremental changes of a varying analog voltage.

Obviously many modifications and variations of the present invention are possible in the light of the above teachings. It is therefore to be understood that within the scope of the appended claims the invention may be practiced otherwise than as specifically described.

What is claimed is:

1. In a non-synchronous digitalized electronic incremental detector, an input terminal, means for providing a variable analog input signal to said input terminal, a common return, a first capacitor connected between said input terminal and said common return, an impedance transformation means connected at its input to said input terminal, a second capacitor, a first junction, said second capacitor connected between the output of said impedance transformation means and said first junction, an operational amplifier connected at its input to said first junction, a third capacitor, a second junction, said third capacitor connected between the output of the operational amplifier and said second junction, a pair of one-shot multivibrators, one of which will provide an output pulse in response to a positively poled amplified variation increment of the analog input signal, the other of which will provide an output pulse in response to a negatively poled amplified variation increment of the analog input signal, the input of the two multivibrators connected to said second junction, a pair of steering diodes, a third junction, said steering diodes connected to provide a current path from like poled outputs of the two multivibrators to said third junction, a pair of diode clamps connected to said third junction and to said common return, a first of said diode clamps connected to said first junction and a second of said diode clamps connected to said second junction, said first diode clamp being so connected as to reset the second capacitor to the level of the first capacitor during the operation of either of the multivibrators and the second diode clamp so connected as to reset the third capacitor to its original level during the operation of either of the multivibrators.

2. In a non-synchronous digitalized electronic incremental detector, an input terminal, means for providing a variable analog input signal to said input terminal, a common return, energy storage means connected between said input terminal and said common return, an impedance transformation means connected at its input to said input terminal, means for blocking the direct current component connected to the output of said impedance transformation means, means for passing the alternating current component connected to said output of said impedance transformation means, an amplifying means, the means for amplifying connected to the output of the means for passing for resolving significant increments, a pair of oppositely poled mono-stable pulse generating means, capacitive component means connected between the said means for amplifying and said generating means, each of said generating means being operative upon receipt of a properly poled increment, means for restoring the direct current component in said means for blocking to the level of the stored input signal, means for restoring said capacitive component means to its original level, each of said means for restoring comprising a diode clamp connected between the output of each mono-stable pulse generating means and the output of each component restored.

3. In a non-synchronous digitalized electronic incremental detector, an input terminal, means for providing a variable analog input signal to said input terminal, a common return, energy storage means connected between said input terminal and said common return, an impedance transformation means connected at its input to said input terminal, means for blocking the direct current component of the output of said impedance transformation means, a first junction, means for passing the alternating current component of said output of said impedance transformation means, means for amplifying the output of the means for passing to resolve significant increments thereof, connected to said first junction, a second junction, a pair of oppositely poled one-shot multivibrators, one of which will provide an output pulse in response to a positively poled amplified variation increment of the analog input signal, the other of which will provide an output pulse in response to a negatively poled amplified variation increment of the analog input signal, the input of the two multivibrators connected to said second junction, a pair of steering diodes, a third junction, said steering diodes connected to provide a current path from like poled outputs of the two multivibrators to said third junction, a pair of diode clamps connected to said third junction and to said common return, a first of said diode clamps connected to said first junction and a second of said diode clamps connected to said second junction, said first diode clamp being so connected as to reset the means for blocking the direct current component to the level of the energy storage means during the operation of either of the multivibrators and the second diode clamp so connected as to reset the potential at the third junction to its original level during the operation of either of the multivibrators.

References Cited in the file of this patent

UNITED STATES PATENTS

| | | |
|---|---|---|
| 2,836,356 | Forrest | May 27, 1958 |
| 2,840,806 | Bateman | June 24, 1958 |
| 2,845,597 | Perkins | July 29, 1958 |
| 2,870,436 | Kuder | Jan. 20, 1959 |
| 2,885,662 | Hansen | May 5, 1959 |
| 2,885,663 | Curtis | May 5, 1959 |

OTHER REFERENCES

"Control Engineering," April 1957, pages 107 to 116 (pages 110 and 111 relied on).